United States Patent
Zhang et al.

(10) Patent No.: US 12,073,183 B2
(45) Date of Patent: Aug. 27, 2024

(54) SELF-LEARNING FRAMEWORK OF ZERO-SHOT CROSS-LINGUAL TRANSFER WITH UNCERTAINTY ESTIMATION

(71) Applicant: NEC Laboratories America, Inc., Princeton, NJ (US)

(72) Inventors: Xuchao Zhang, Elkridge, MD (US); Haifeng Chen, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 338 days.

(21) Appl. No.: 17/723,942

(22) Filed: Apr. 19, 2022

(65) Prior Publication Data

US 2022/0366143 A1 Nov. 17, 2022

Related U.S. Application Data

(60) Provisional application No. 63/188,601, filed on May 14, 2021, provisional application No. 63/186,251, filed on May 10, 2021.

(51) Int. Cl.
*G06F 40/295* (2020.01)
*G06N 5/046* (2023.01)
*G06N 20/00* (2019.01)

(52) U.S. Cl.
CPC .......... *G06F 40/295* (2020.01); *G06N 5/046* (2013.01); *G06N 20/00* (2019.01)

(58) Field of Classification Search
USPC .................................................. 704/1–504
See application file for complete search history.

(56) References Cited

U.S. PATENT DOCUMENTS

| | | | | |
|---|---|---|---|---|
| 5,477,451 A * | 12/1995 | Brown | ..................... | G06F 40/49 704/9 |
| 5,768,603 A * | 6/1998 | Brown | ..................... | G06F 40/44 704/7 |
| 9,305,544 B1 * | 4/2016 | Petrov | ..................... | G06F 40/45 |
| 10,269,345 B2 * | 4/2019 | Castillo Sanchez | .... | G10L 13/08 |

(Continued)

OTHER PUBLICATIONS

Liyan Xu et al, Boosting Cross-Lingual Transfer via Self-Learning with Uncertainty Estimation, Proceedings of the 2021 Conference on Empirical Methods in Natural Language Processing, Nov. 7-11, 2021, pp. 6716-6723, Association for Computational Linguistics.

*Primary Examiner* — Marcus T Riley
(74) *Attorney, Agent, or Firm* — Joseph Kolodka

(57) ABSTRACT

A method provided for cross-lingual transfer trains a pre-trained multi-lingual language model based on a gold labeled training set in a source language to obtain a trained model. The method assigns each sample in an unlabeled target language set to a silver label according to a model prediction by the trained model to obtain set of silver labels, and performs uncertainty-aware label selection based on the silver label assigned to each sample according to the model prediction and the trained model to obtain selected silver labels. The method performs iterative training on the selected labels by applying the selected silver labels in the target language set as training labels and re-training the trained model with the gold labels and the selected silver labels to obtain an iterative model, and performs task-specific result prediction in target languages based on the iterative model to generate a final predicted result in target languages.

20 Claims, 7 Drawing Sheets

(56) References Cited

U.S. PATENT DOCUMENTS

| | | | |
|---|---|---|---|
| 10,567,477 B2* | 2/2020 | Sumner | G06F 3/04842 |
| 10,691,473 B2* | 6/2020 | Karashchuk | H04W 4/12 |
| 10,747,498 B2* | 8/2020 | Stasior | G06F 3/0656 |
| 10,755,703 B2* | 8/2020 | Zeitlin | G10L 15/22 |
| 11,037,565 B2* | 6/2021 | Kudurshian | G06F 3/167 |
| 11,526,368 B2* | 12/2022 | Karashchuk | G06Q 10/109 |
| 2007/0087756 A1* | 4/2007 | Hoffberg | G06Q 10/06375 |
| | | | 455/450 |
| 2010/0317420 A1* | 12/2010 | Hoffberg | G06Q 30/0282 |
| | | | 463/1 |
| 2021/0117760 A1* | 4/2021 | Krishnan | G06N 3/08 |
| 2022/0366143 A1* | 11/2022 | Zhang | G06F 40/295 |

* cited by examiner

SELF-LEARNING FRAMEWORK OF ZERO-SHOT CROSS-LINGUAL TRANSFER WITH UNCERTAINTY ESTIMATION

RELATED APPLICATION INFORMATION

This application claims priority to U.S. Provisional Patent Application No. 63/186,251, filed on May 10, 2021, and U.S. Provisional Patent Application No. 63/188,601, filed on May 14, 2021, incorporated herein by reference in their respective entireties.

BACKGROUND

Technical Field

The present invention relates to artificial intelligence and more particularly to a self-learning framework of zero-shot cross-lingual transfer with uncertainty estimation.

Description of the Related Art

Recent multilingual pre-trained language models have achieved remarkable zero-shot performance on cross-lingual transfer tasks, where the model is only finetuned on one source language and directly evaluated on multiple target languages. However, such models cannot make accurate predictions when the labels are not available for target languages in down-streaming tasks. The label issue makes the models hard to learn the task-specific knowledge for target languages.

SUMMARY

According to aspects of the present invention, a computer-implemented method is provided for cross-lingual transfer. The method includes training a pre-trained multi-lingual language model based on a gold labeled training set in a source language to obtain a trained model. The method further includes assigning each sample in an unlabeled target language set to a silver label according to a model prediction by the trained model to obtain set of silver labels. The method also includes performing uncertainty-aware label selection based on the silver label assigned to each sample according to the model prediction and the trained model to obtain selected silver labels. The method additionally includes performing, by a hardware processor, iterative training on the selected labels by applying the selected silver labels in the target language set as training labels and re-training the trained model with the gold labels and the selected silver labels to obtain an iterative model. The method further includes performing task-specific result prediction in target languages based on the iterative model to generate a final predicted result for a test set in target languages.

According to other aspects of the present invention, a computer program product is provided for cross-lingual transfer. The computer program product includes a non-transitory computer readable storage medium having program instructions embodied therewith. The program instructions are executable by a computer to cause the computer to perform a method. The method includes training, by a hardware processor of the computer, a pre-trained multi-lingual language model based on a gold labeled training set in a source language to obtain a trained model. The method further includes assigning, by a hardware processor, each sample in an unlabeled target language set to a silver label according to a model prediction by the trained model to obtain set of silver labels. The method also includes performing, by a hardware processor, uncertainty-aware label selection based on the silver label assigned to each sample according to the model prediction and the trained model to obtain selected silver labels. The method additionally includes performing, by the hardware processor, iterative training on the selected labels by applying the selected silver labels in the target language set as training labels and re-training the trained model with the gold labels and the selected silver labels to obtain an iterative model. The method further includes performing, by the hardware processor, task-specific result prediction in target languages based on the iterative model to generate a final predicted result for a test set in target languages.

According to yet other aspects of the present invention, a computer processing system is provided for cross-lingual transfer. The computer processing system includes a memory device. The computer processing system further includes a processor device operatively coupled to the memory device for running the program code to train a pre-trained multi-lingual language model based on a gold labeled training set in a source language to obtain a trained model. The processor device further runs the program code to assign each sample in an unlabeled target language set to a silver label according to a model prediction by the trained model to obtain set of silver labels. The processor device also runs the program code to perform uncertainty-aware label selection based on the silver label assigned to each sample according to the model prediction and the trained model to obtain selected silver labels. The processor device additionally runs the program code to perform iterative training on the selected labels by applying the selected silver labels in the target language set as training labels and re-training the trained model with the gold labels and the selected silver labels to obtain an iterative model. The processor device further runs the program code to perform task-specific result prediction in target languages based on the iterative model to generate a final predicted result for a test set in target languages.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to A self-learning framework of zero-shot cross-lingual transfer with uncertainty estimation.

Embodiments of the present invention aim to approach the problem of cross-lingual zero-shot learning via an uncertainty-aware self-training method as follows. Given a corpus of a cross-lingual transfer task (such as named entity recognition, natural language inference, etc.) in the source language such as English, our goal is to learn a cross-lingual model from the source language and transfer the knowledge (capability of handling the task in the source language) to target languages in which no training data is available.

Embodiments of the present invention provide a framework that further utilizes unlabeled data of target languages, where the prediction of unlabeled data is used as silver labels in a self-training process. Uncertainty estimation is also combined within this process to select confident prediction.

Figure 1:
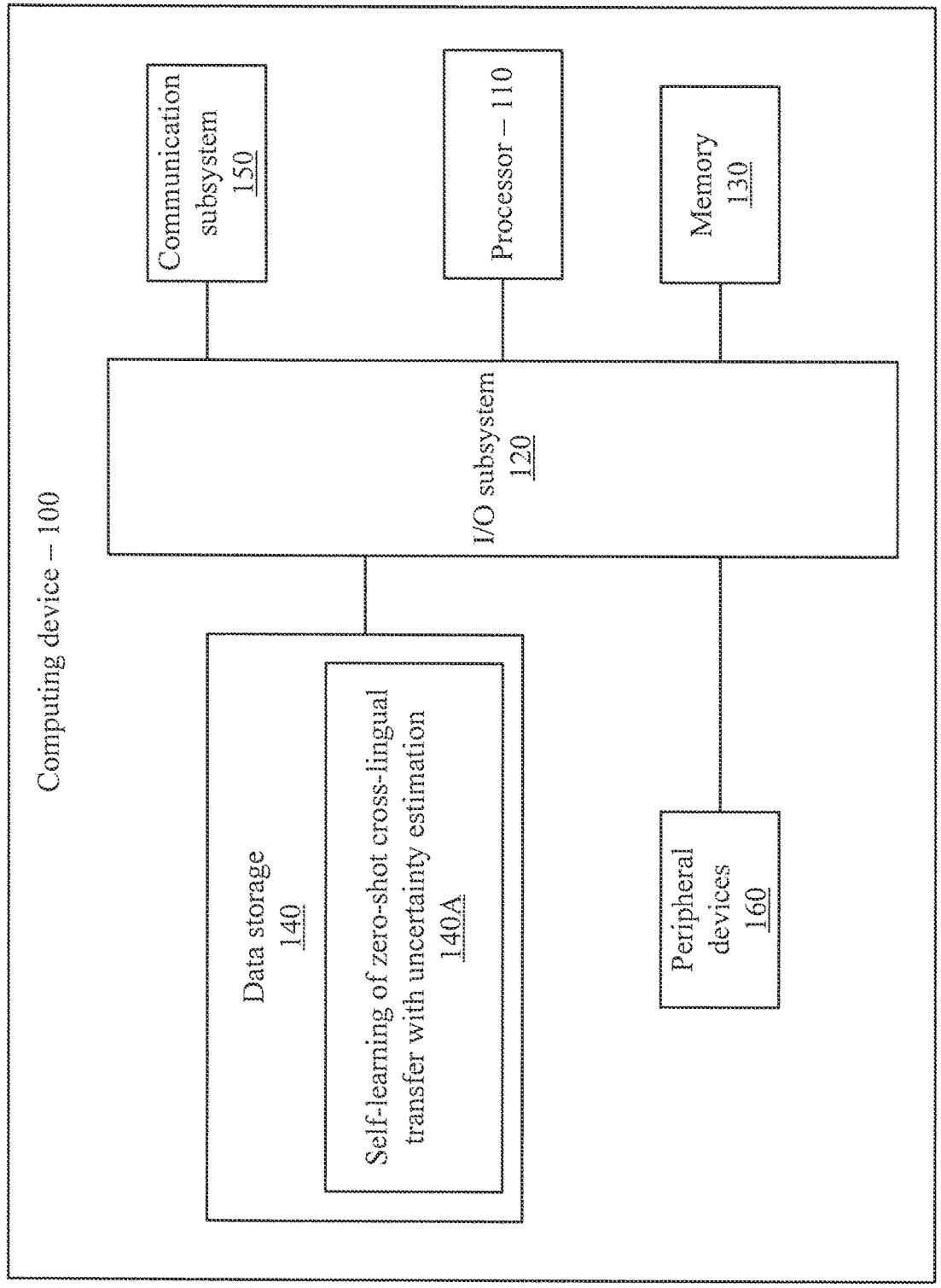
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform self-learning of zero-shot cross-lingual transfer with uncertainty estimation.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for self-learning of zero-shot cross-lingual transfer with uncertainty estimation. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor—or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention Embodiments of the present invention focus on the following inductive setting.

A corpus of cross-lingual transfer task, in which only source language training data is labeled. The goal is to learn the cross-lingual model from the source language and transfer the knowledge to the target language(s).

To that end, embodiments of the present invention provide an Uncertainty-Aware Self-training method for Cross-lingual Zero-Shot Transfer task (USCT) to address the Cross-Lingual Zero-Shot problem under the setting stated above. Embodiments of the present invention solve the problem as follows as described in FIG. 2.

Figure 2:
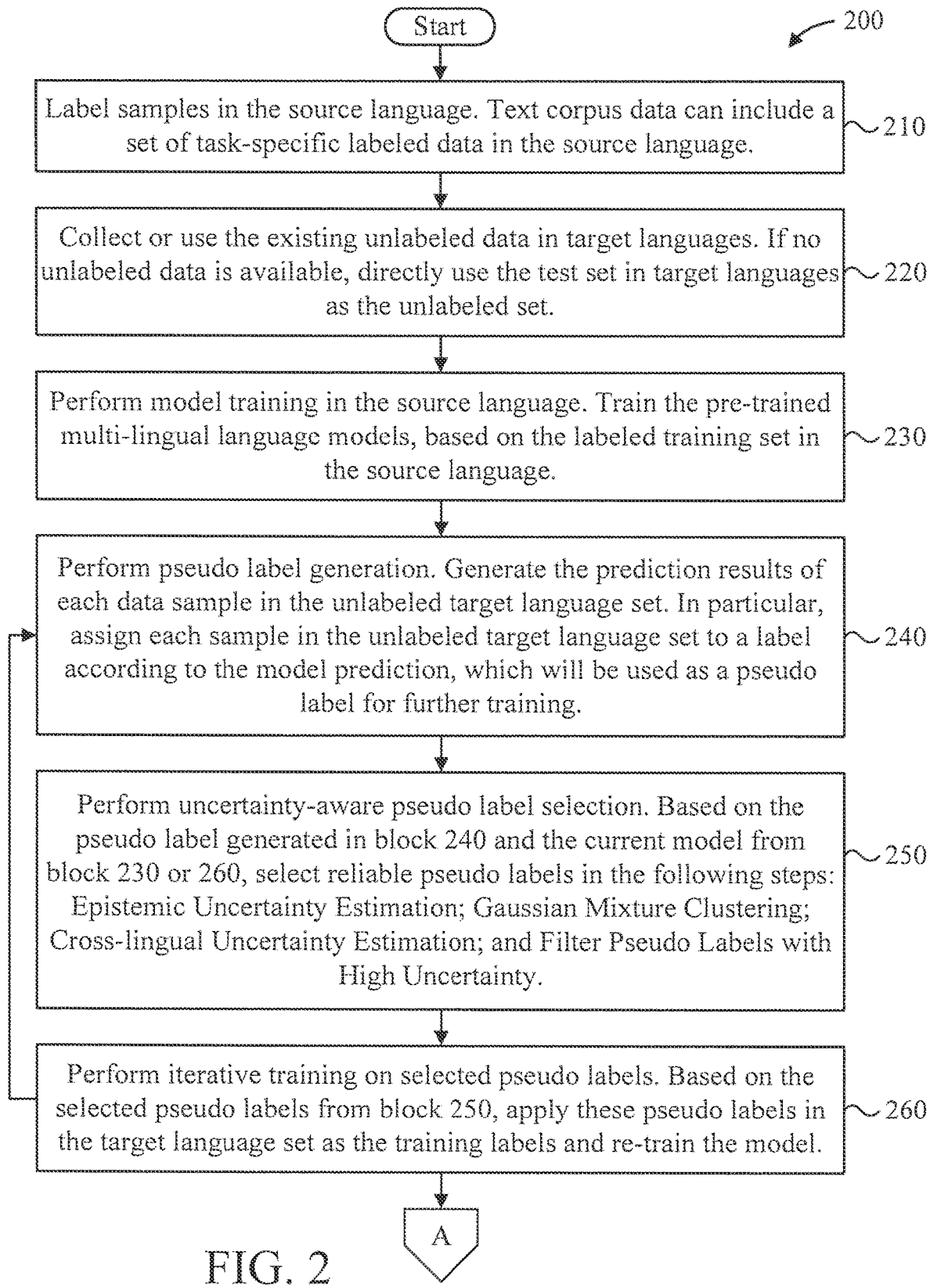
FIGS. 2-3 are block diagrams showing an exemplary method for self-learning of zero-shot cross-lingual transfer with uncertainty estimation, in accordance with an embodiment of the present invention.
Figure 3:
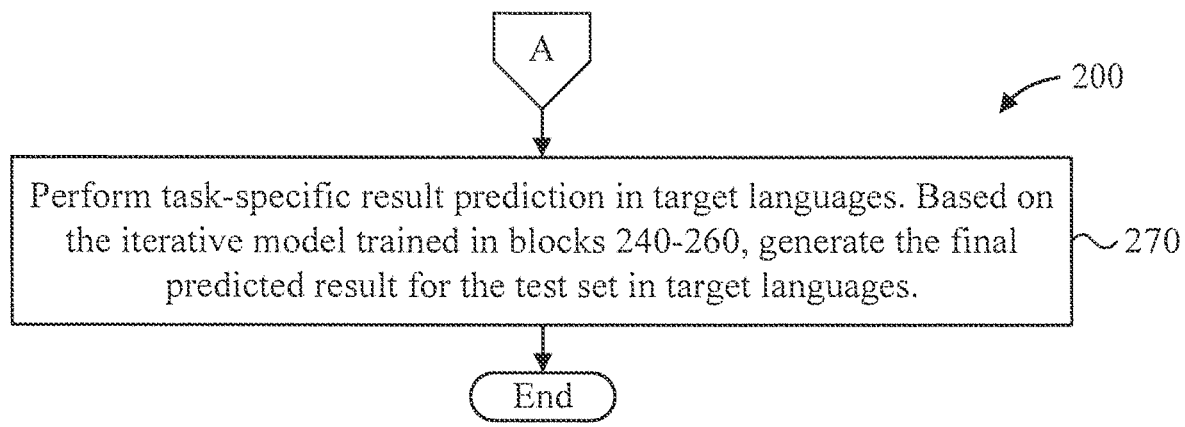

FIGS. 2-3 are flow diagrams showing an exemplary method 200 for self-learning of zero-shot cross-lingual transfer with uncertainty estimation, in accordance with an embodiment of the present invention. It is to be appreciated that method 200 can be implemented using any type of computer code including, for example, but not limited to object oriented programming languages such as C++ or the like, and conventional procedural programming languages, such as the "C" programming language or similar programming languages. Of course, other languages can also be used, while maintaining the spirit of the present invention.

At block 210, label samples in the source language. In an embodiment, text corpus data includes a set of task-specific labeled data in the source language. In an embodiment, the labels for the source language are gold labels, i.e., determined by an expert annotator. The task of block 210 includes sequentially labeling the source language to perform, e.g., but not limited to, Part-Of-Speech (POS) tagging, Named Entity Recognition (NER) or text classification such as Natural Language Inference (NLI). Of course, other tasks can also be involved, as readily appreciated by one of ordinary skill, given the teachings of the present invention provided herein.

At block 220, collect or use the existing unlabeled data in target languages. If no unlabeled data is available, directly use the test set in target languages as the unlabeled set.

At block 230, perform model training in the source language. Train the pre-trained multi-lingual language models (such as, e.g., mBERT, XLM-R, and so forth), based on the labeled training set in the source language.

At block 240, perform pseudo label generation. Generate the prediction results of each data sample in the unlabeled target language set. In particular, assign each sample in the unlabeled target language set to a label according to the model prediction, which will be used as a pseudo label for further training.

At block 250, perform uncertainty-aware pseudo label selection. Based on the pseudo label generated in block 240 and the current model from block 230 or 260, select reliable pseudo labels in the following steps: Epistemic Uncertainty Estimation; Gaussian Mixture Clustering; Cross-lingual Uncertainty Estimation; and Filter Pseudo Labels with High Uncertainty.

Basically, we combine the epistemic uncertainty and the multi-lingual transfer uncertainty together to estimate the reliability of the pseudo label.

The details of each step are described in further detail below.

At block 260, perform iterative training on selected pseudo labels. Based on the selected pseudo labels from block 250, apply these pseudo labels in the target language set as the training labels and re-train the model.

At block 270, perform task-specific result prediction in target languages. Based on the iterative model trained in blocks 240-260, generate the final predicted result for the test set in target languages.

Figure 4:
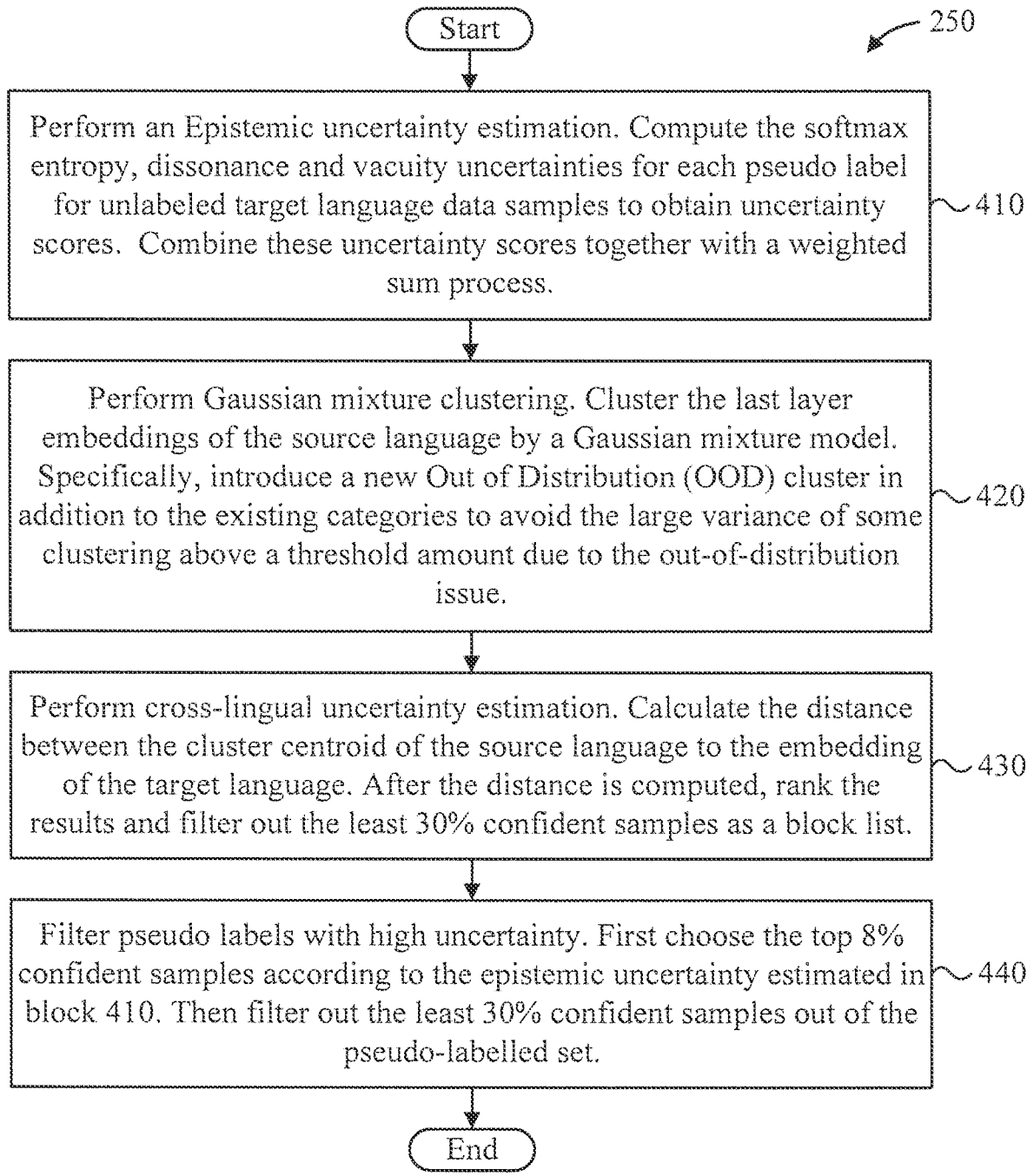
FIG. 4 is a flow diagram further showing block 250 of FIG. 2, in accordance with an embodiment of the present invention.

FIG. 4 is a flow diagram further showing block 250 of FIG. 2, in accordance with an embodiment of the present invention.

At block 410, perform an Epistemic uncertainty estimation. Compute the softmax entropy, dissonance and vacuity uncertainties for each pseudo label for unlabeled target language data samples to obtain uncertainty scores. Combine these uncertainty scores together with a weighted sum process.

At block 420, perform Gaussian mixture clustering. Cluster the last layer embeddings of the source language by a Gaussian mixture model. Specifically, introduce a new Out of Distribution (OOD) cluster in addition to the existing categories to avoid the large variance of some clustering above a threshold amount due to the out-of-distribution issue.

At block 430, perform cross-lingual uncertainty estimation. Calculate the distance between the cluster centroid of the source language to the embedding of the target language. After the distance is computed, rank the results and filter out the least 30% confident samples as a block list.

At block 440, filter pseudo labels with high uncertainty. First choose the top 8% confident samples according to the epistemic uncertainty estimated in block 410. Then filter out the least 30% confident samples out of the pseudo-labelled set. While 8% and 30% are used for examples, it is to be appreciated that a value in the range of 6-10% can be used for the top M % confident samples according to the epistemic uncertainty, and a value in the range of 25-35% can be used for the least N % confident samples out of the pseudo-labelled set, where M and N are integers greater than 1, and M<N. Thus we add top 8% most confident samples into the training set for each iteration in an embodiment.

A multilingual pre-trained language model is employed to encode each input sequence, followed by a linear layer to classify on the hidden state of CLS token for NLI as sequence classification, and of each token for NER as token classification. Cross-entropy (CE) loss is used during training.

A description will now be given regarding a Self-Learning (SL) framework, in accordance with an embodiment of the present invention.

Figure 5:
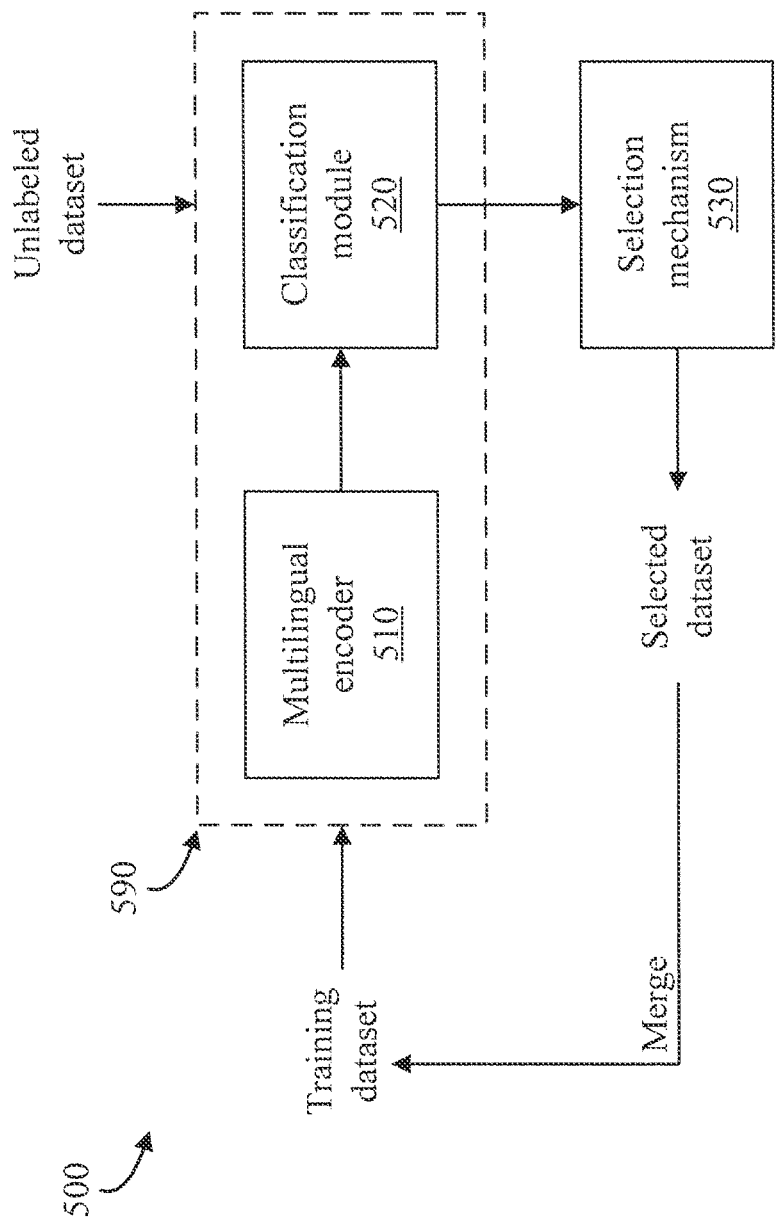
FIG. 5 is a block diagram showing an exemplary self-learning framework with uncertainty, in accordance with an embodiment of the present invention.

FIG. 5 is a block diagram showing an exemplary self-learning framework 500 with uncertainty, in accordance with an embodiment of the present invention.

The self-learning framework 500 includes a multilingual encoder 510, a classification module 520, and a selection mechanism 530. The multilingual encoder 510 and classification module 520 form a task-specific model 590. The task-specific model 590 receives an unlabeled dataset and a training dataset. The selection mechanism 530 outputs a selected dataset which is merged with the training dataset.

The task-agnostic SL framework for classification is formulated into four phases, namely a training phrase, a prediction phrase, a uncertainty estimation phase, and a selection phase.

In the training phase, the model parameter W gets optimized by the training inputs X and labels Y, with Y being gold labels of source language in the first iteration, along with silver labels of target languages in later iterations. Different languages are mixed together in batches. Silver labels are labels generated by a machine learning process. In contrast, gold labels are annotated by an expert (human) annotator.

In the prediction phase, the model predicts on the remaining unlabeled data $X^*_t=\{x^*_{t1}, \ldots, x^*_{tN}\}$ of each target language t, denoted as $y^*=f^w(x^*)$.

In the uncertainty estimation phase, the model estimates the prediction uncertainty based on one of the metrics described below, denoted as $\gamma=f_\gamma^w(x^*, y^*)$, representing the model confidence of the prediction. In the selection phase, each $X^*_t$ is ranked based on uncertainty $\gamma$, and we select top-K percent of each $X^*_t$ with their predictions as silver labels, adding to the training data. To avoid posing inductive bias from imbalanced class distribution, we select equal amount of inputs for each label type, similar to previous work on self-learning.

After selection, the model goes back to the training phase and starts a new iteration with the updated training set. The entire process keeps iterating until there is no remaining unlabeled data. Early stop criteria are implemented on the dev set of the source language only, as gold labels are not available for other languages. Each module can be adjusted by task-specific requirements.

A description will now be given regarding uncertainty metrics, in accordance with an embodiment of the present invention.

Five different uncertainty metrics are investigated in the framework. Let C be the label classes, and $p_c$ be the softmax probability of the class c for an input.

MPR is the max probability of label classes, denoted by $\gamma=\max_c p_c$. It is equivalent to the probability of the predicted label, and is commonly used as the selecting criterion for classification tasks.

ENT is the entropy of the class probability distribution, denoted by $\gamma=-\Sigma_c p_c \cdot \log p_c$, which is another common uncertainty metric for classification (.

VAR injects Gaussian noise into class logits whose variance is predicted by the model as an input-dependent uncertainty. A Gaussian distribution is placed on the logit space $\hat{f} \sim N(f^w, (\sigma^w)^2)$, where the model is modified to predict both raw logit $f^w$ and standard deviation $\sigma^w$ given each input. We use the expectation over softmax on the logit as the new probability, computed by Monte Carlo sampling:

$$p_c = E[\text{softmax}(\hat{f}_c)] = \frac{1}{T}\sum_t \text{softmax}(f_{tc}),$$

with $f_{tc}$ being the logit for class c as tth sampling. During training, the CE loss for each input is modified to account for the new probability formulation as follows:

$$L' = -\log\frac{1}{T}\sum_t \exp(-L_t(x, c)) \tag{1}$$

The new loss is composed of the CE loss $L_t(x, c)$ on input x and gold class c with tth sampled probabilities. The final uncertainty is the entropy of the new probabilities, similar to ENT. When the predicted variance is high, the entropy will increase, as the probability distribution tends to be uniform.

LUN estimates the uncertainty for each language predicted by the model. Similar to the formulation of task uncertainty, it is proposed to place an uncertainty $\sigma_t$ on each language t as the homoscedastic uncertainty regardless of input data. $\sigma$ is used as the softmax temperature:

$$p_c = \text{softmax}\left(\frac{1}{\sigma^2} f_c^w\right),$$

and the final uncertainty is the entropy of the scaled probabilities, similar to ENT. A higher $\sigma_t$ leads to higher entropy of all inputs of language t, as the probability distribution tends to be more uniform. During training, each $\sigma_t$ is a learned parameter directly, and the new loss for an input of language t can be approximated as follows:

$$L' \approx \frac{1}{\sigma_t^2} L(x, c) + \log \sigma_t \tag{2}$$

L(x, c) is the same CE loss as in Eq (1). Note that LUN does not change the selection within each language; here we mainly use it as an optimization strategy to jointly train inputs of all languages.

EVI estimates the evidence-based uncertainty, where the softmax probability is replaced with Dirichlet distribution and each predicted logit for class c is regarded as the evidence. We employ decomposed uncertainty vacuity and dissonance. Specifically, vacuity is high when there lacks evidence for all the classes, indicating out-of-distribution (OOD). Dissonance is high when there is conflict of strong evidence for all the classes. The model shows an uncertain prediction if either vacuity or dissonance is high. The loss for each input is as follows:

$$L = \sum_c (y_c - p_c)^2 + \frac{p_c(1 - p_c)}{S + 1} \tag{3}$$

$y_c$ is 1 for the gold class or 0 for others; S is the total evidence.

Figure 6:
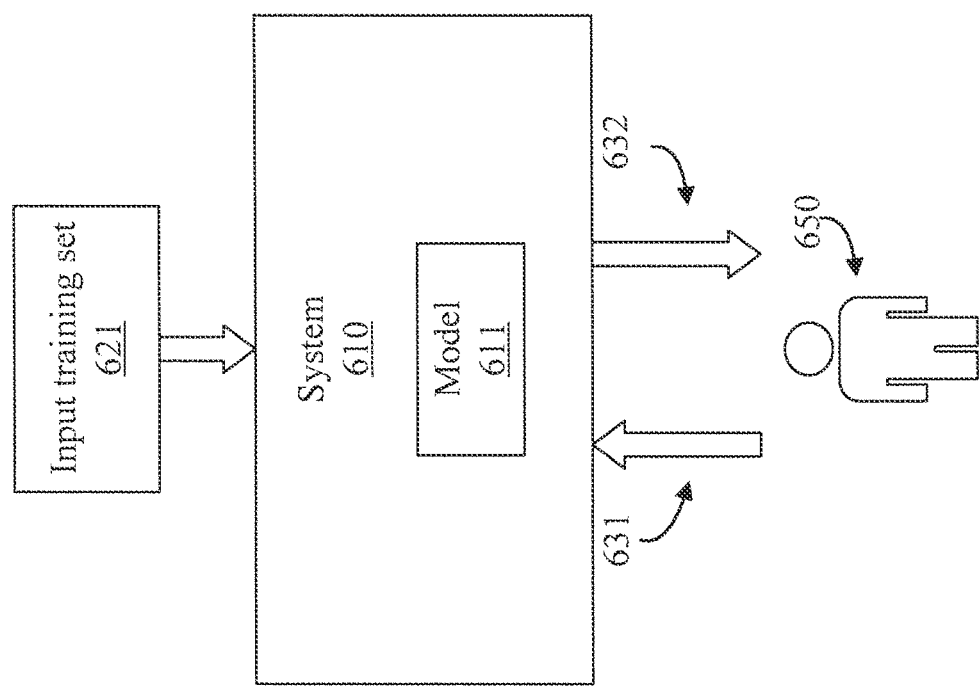
FIG. 6 is a block diagram showing an exemplary Named Entity Recognition (NER) session, in accordance with an embodiment of the present invention.

FIG. 6 is a block diagram showing an exemplary Named Entity Recognition (NER) session 600, in accordance with an embodiment of the present invention.

The system 610 receives an input training dataset of samples and gold labels, generates silver labels, and trains a model 611 to perform NER using both the gold and silver labels.

Figure 7:
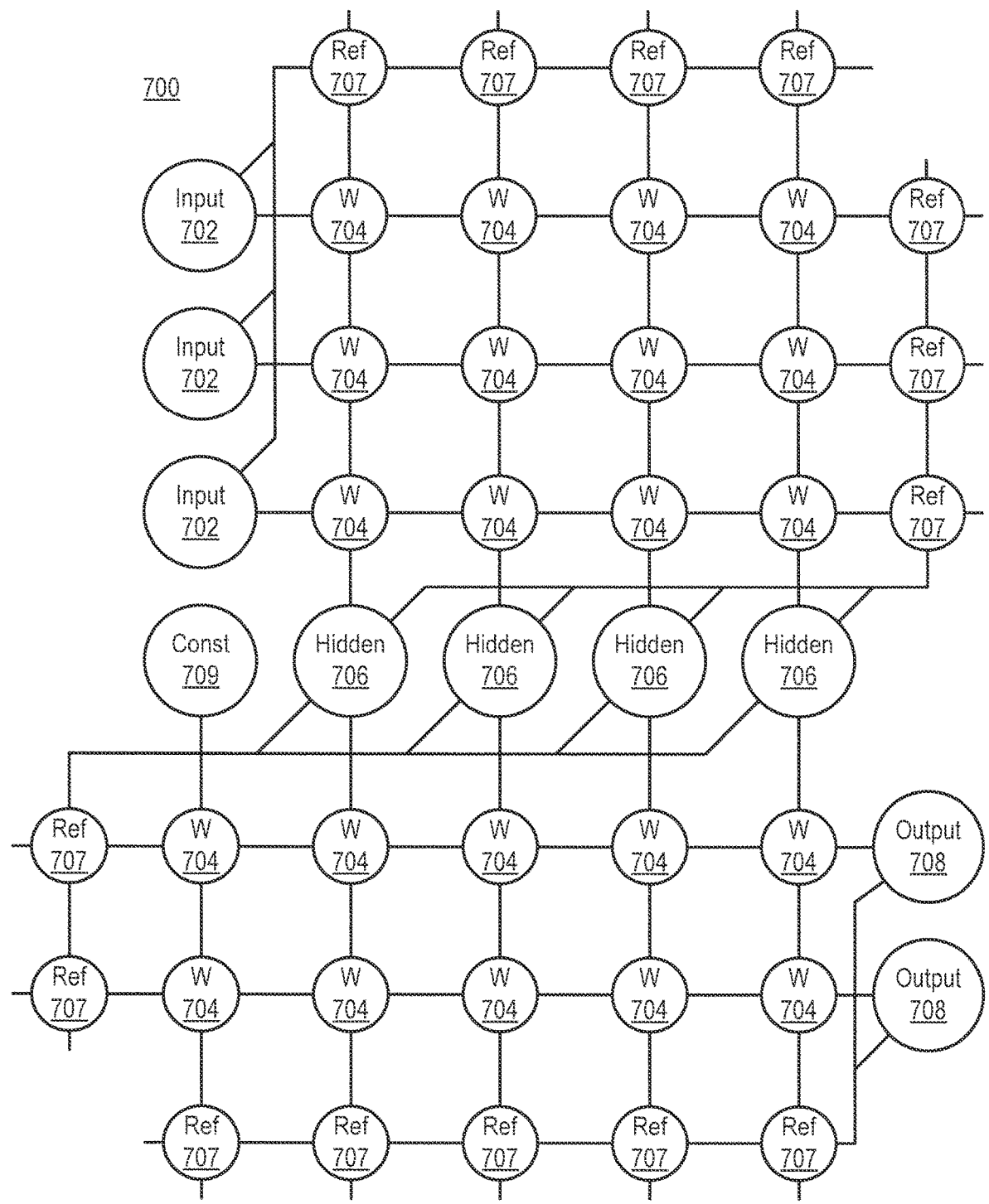
FIG. 7 is a block diagram showing an artificial neural network (ANN) architecture, in accordance with an embodiment of the present invention.

During a recognition session, a user 650 inputs a document 631 in a source language, and the model determines the named entities 632 in the document 631 in a target language, FIG. 7 is a block diagram showing an artificial neural network (ANN) architecture 700, in accordance with an embodiment of the present invention. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 702 each provide an input signal in parallel to a respective row of weights 704. The weights 704 each have a respective settable value, such that a weight output passes from the weight 704 to a respective hidden neuron 706 to represent the weighted input to the hidden neuron 706. In software embodiments, the weights 704 may simply be represented as coefficient values that are multiplied against the relevant signals. The signals from each weight adds column-wise and flows to a hidden neuron 706.

The hidden neurons 706 use the signals from the array of weight 704 to perform some calculation. The hidden neurons 706 then output a signal of their own to another array of weights 704. This array performs in the same way, with a column of weights 604 receiving a signal from their respective hidden neuron 706 to produce a weighted signal output that adds row-wise and is provided to the output neuron 708.

It should be understood that any number of these stages may be implemented, by interposing additional layers of arrays and hidden neurons 706. It should also be noted that some neurons may be constant neurons 709, which provide a constant output to the array. The constant neurons 709 can be present among the input neurons 602 and/or hidden neurons 706 and are only used during feed-forward operation.

During back propagation, the output neurons 708 provide a signal back across the array of weights 704. The output layer compares the generated network response to training data and computes an error. The error signal can be made proportional to the error value. In this example, a row of weights 704 receives a signal from a respective output neuron 608 in parallel and produces an output which adds column-wise to provide an input to hidden neurons 706. The hidden neurons 706 combine the weighted feedback signal with a derivative of its feed-forward calculation and stores an error value before outputting a feedback signal to its respective column of weights 704. This back propagation travels through the entire network 700 until all hidden neurons 706 and the input neurons 702 have stored an error value.

During weight updates, the stored error values are used to update the settable values of the weights 704. In this manner the weights 704 can be trained to adapt the neural network 700 to errors in its processing. It should be noted that the three modes of operation, feed forward, back propagation, and weight update, do not overlap with one another.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for cross-lingual transfer, comprising:
    training a pre-trained multi-lingual language model based on a gold labeled training set in a source language to obtain a trained model;
    assigning each sample in an unlabeled target language set to a silver label according to a model prediction by the trained model to obtain a set of silver labels;
    performing uncertainty-aware pseudo label selection based on a silver label assigned to each sample according to the model prediction and the trained model to obtain selected silver labels;
    performing, by a hardware processor, iterative training on the selected labels by applying the selected silver labels in the unlabeled target language set as training labels and re-training the trained model with gold labels and the selected silver labels to obtain an iterative model; and performing task-specific result prediction in target languages based on the iterative model to generate a final predicted result for a test set in target languages.

2. The computer-implemented method of claim 1, further comprising labeling samples in the source language using task-specific labels.

3. The computer-implemented method of claim 2, wherein the samples in the source language are labeled for Part-of-Speech (POS) tagging.

4. The computer-implemented method of claim 2, wherein the samples in the source language are labeled for Named Entity Recognition (NER).

5. The computer-implemented method of claim 2, wherein the samples in the source language are labeled for Natural Language Inference (NLI).

6. The computer-implemented method of claim 1, further comprising collecting unlabeled data when available or directly using a test set of existing unlabeled data in target languages as the unlabeled data.

7. The computer-implemented method of claim 1, wherein the uncertainty-aware pseudo label selection comprises performing an Epistemic uncertainty estimation by computing a softmax entropy uncertainty score, a dissonance uncertainty score, and a vacuity uncertainty score for each pseudo label for unlabeled target language data samples in the unlabeled target language set, and combining the uncertainty scores together with a weighted sum process.

8. The computer-implemented method of claim 1, wherein the uncertainty-aware pseudo label selection comprises performing Gaussian mixture clustering by clustering a last layer of embeddings of the source language by a Gaussian mixture model.

9. The computer-implemented method of claim 8, wherein the uncertainty-aware pseudo label selection comprises introducing a new Out Of Distribution (OOD) cluster in addition to existing categories to avoid a large variance of some clustering above a threshold amount due to an out-of-distribution issue.

10. The computer-implemented method of claim 1, wherein the uncertainty-aware pseudo label selection comprises performing a cross-lingual uncertainty estimation by calculating a distance between a cluster centroid of the source language to an embedding of the target language, ranking the results, and filtering out a least X percent of confident samples as a block list, where X is an integer greater than one.

11. The computer-implemented method of claim 10, wherein X is equal to 30.

12. The computer-implemented method of claim 1, wherein the uncertainty-aware pseudo label selection comprises filtering pseudo labels with a high uncertainty by initially choosing a top X % confident samples according to an epistemic uncertainty estimated, and then filtering out a least Y % confident samples corresponding to a set of labels, where X and Y are integers greater than 1, and X<Y.

13. The computer-implemented method of claim 10, wherein X is equal to 8, and Y is equal to 30.

14. The computer-implemented method of claim 1, wherein the iterative training comprises optimizing a model parameter using the gold labels in a first training iteration, and additionally with the selected silver labels in subsequent training iterations.

15. A computer program product for cross-lingual transfer, the computer program product comprising a non-transitory computer readable storage medium having program instructions embodied therewith, the program instructions executable by a computer to cause the computer to perform a method comprising:

training, by a hardware processor of the computer, a pre-trained multi-lingual language model based on a gold labeled training set in a source language to obtain a trained model;

assigning, by a hardware processor, each sample in an unlabeled target language set to a silver label according to a model prediction by the trained model to obtain set of silver labels;

performing, by a hardware processor, uncertainty-aware pseudo label selection based on the silver label assigned to each sample according to the model prediction and the trained model to obtain selected silver labels;

performing, by the hardware processor, iterative training on the selected silver labels by applying the selected silver labels in the unlabeled target language set as training labels and re-training the trained model with gold labels and the selected silver labels to obtain an iterative model; and performing, by the hardware processor, task-specific result prediction in target languages based on the iterative model to generate a final predicted result for a test set in target languages.

16. The computer program product of claim 15, wherein the uncertainty-aware pseudo label selection comprises performing an Epistemic uncertainty estimation by computing a softmax entropy uncertainty score, a dissonance uncertainty score, and a vacuity uncertainty score for each pseudo label for unlabeled target language data samples in the unlabeled target language set, and combining the uncertainty scores together with a weighted sum process.

17. The computer program product of claim 15, wherein the uncertainty-aware pseudo label selection comprises performing Gaussian mixture clustering by clustering a last layer of embeddings of the source language by a Gaussian mixture model.

18. The computer program product of claim 17, wherein the uncertainty-aware pseudo label selection comprises introducing a new Out Of Distribution (OOD) cluster in addition to existing categories to avoid a large variance of some clustering above a threshold amount due to an out-of-distribution issue.

19. The computer program product of claim 15, wherein the iterative training comprises optimizing a model parameter using the gold labels in a first training iteration, and additionally with the selected silver labels in subsequent training iterations.

20. A computer processing system for cross-lingual transfer, comprising:

a memory device; and a processor device operatively coupled to the memory device for running a program code to:

train a pre-trained multi-lingual language model based on a gold labeled training set in a source language to obtain a trained model;

assign each sample in an unlabeled target language set to a silver label according to a model prediction by the trained model to obtain a set of silver labels;

perform uncertainty-aware label selection based on the silver label assigned to each sample according to the model prediction and the trained model to obtain selected silver labels;

perform iterative training on the selected silver labels by applying the selected silver labels in the unlabeled target language set as training labels and re-training the trained model with gold labels and the selected silver labels to obtain an iterative model; and perform task-specific result prediction in target languages based on the iterative model to generate a final predicted result for a test set in target languages.

\* \* \* \* \*